United States Patent Office 3,103,425
Patented Sept. 10, 1963

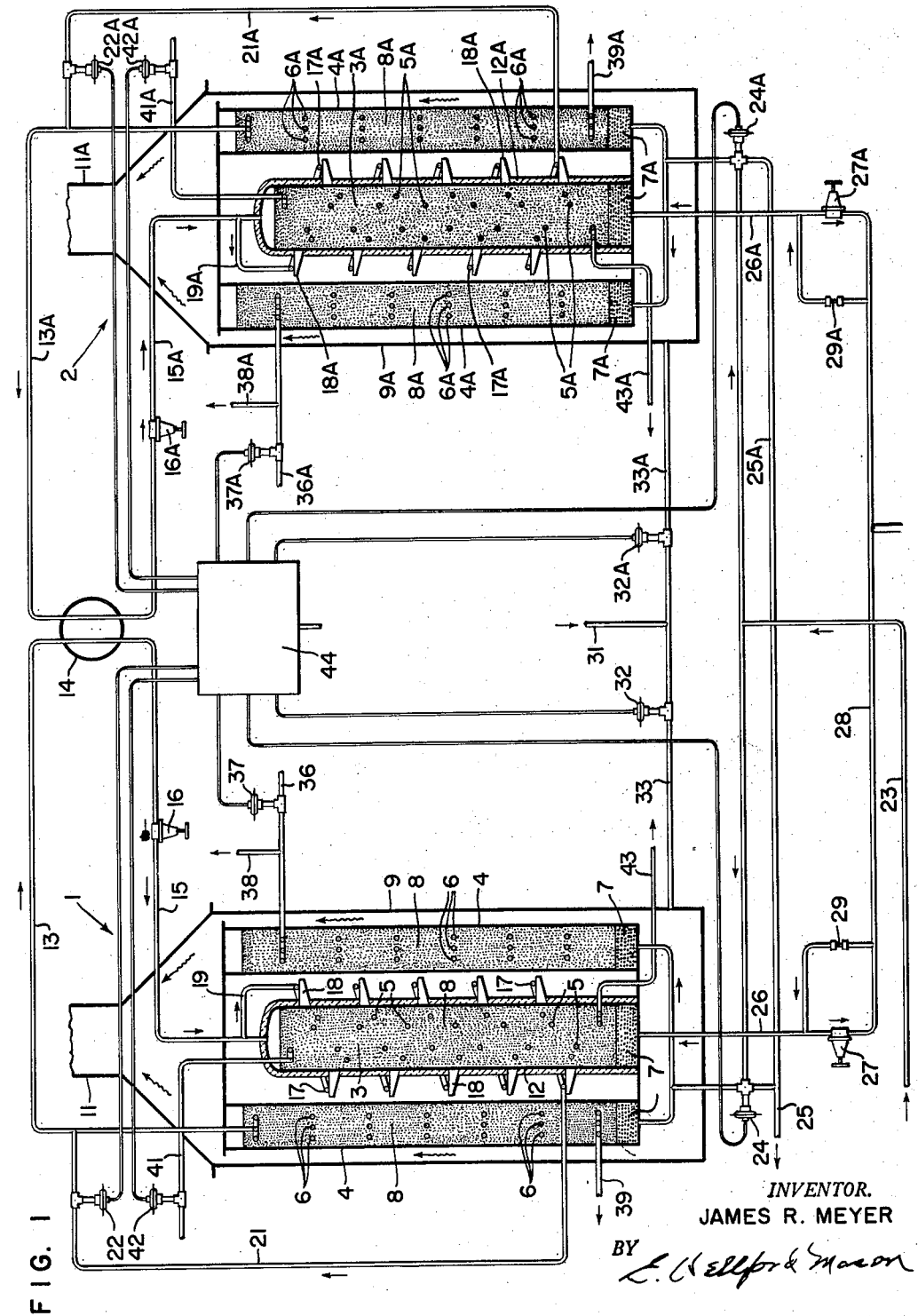

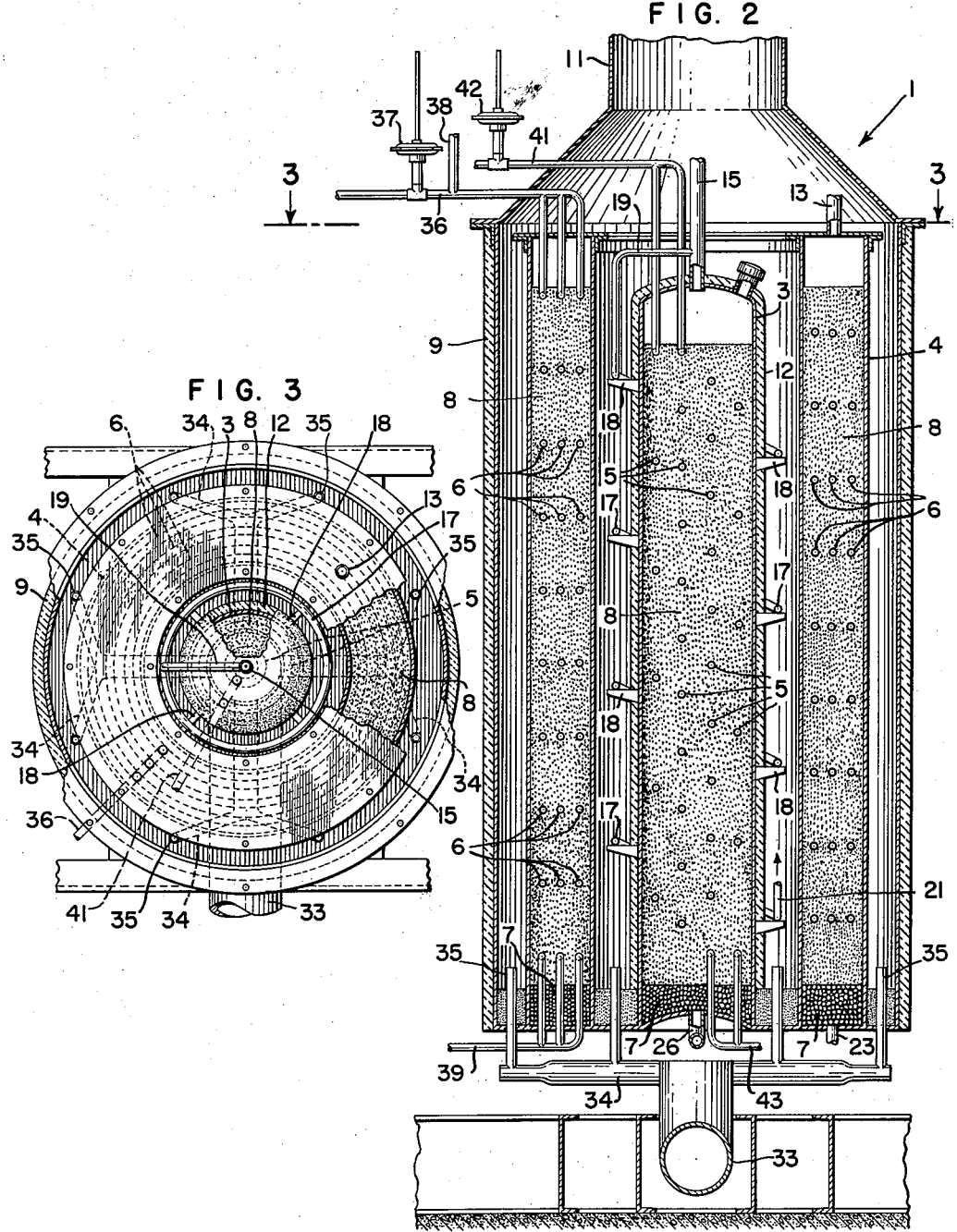

3,103,425
ADSORPTION APPARATUS AND METHOD
James R. Meyer, Lewiston, N.Y., assignor to Chemical Design, Inc., a corporation of New York
Filed Oct. 16, 1959, Ser. No. 846,885
11 Claims. (Cl. 55—62)

The present invention relates to the adsorption of gases, and more particularly to a method and apparatus for selectively adsorbing gases in a gas purification process.

Frequently it is desirable to obtain a single gas from a mixture of a plurality of gases. One way of accomplishing this is to pass the mixture over a material that is capable, under various temperature and pressure conditions, of selectively adsorbing one or more of the gases of the mixture. The adsorbed gases, if they are the desired ones, can be recovered. Or the gas which is not adsorbed can be collected. In either event, the manner in which the gases are handled and the apparatus used are important elements in the success of the process.

It is an object of the invention to provide a method of purifying a stream of a mixture of gases by treating them under selected temperature and pressure conditions to adsorb one or more gases from the mixture so that a pure gas can be obtained.

It is a further object of the invention to provide an apparatus whereby the selective adsorption of gases can be accomplished to produce a pure gas from a stream consisting of a mixture of gases.

It is a further object of the invention to provide an adsorption apparatus of the two tower type in which the gas to be treated is flowing through one tower while the other tower is being reactivated. Each tower is of a type through which the gas being treated makes two passes under controlled conditions. The switching of the flow of gas from one tower to the other can be accomplished automatically or manually as desired.

While the method and apparatus of the invention are applicable to the separation of any immiscible gases, one of which can be adsorbed, it will be described herein as being used for the purification of hydrogen by the removal of carbon dioxide and carbon monoxide therefrom. This can be accomplished by the use of an adsorbing material of the type known as a molecular sieve, and which consists of an alkali metal aluminosilicate in crystalline form. This material has the characteristic of selective adsorption of carbon dioxide and carbon monoxide at different temperatures. This is accomplished by constructing each tower in two sections and maintaining each section at a different temperature.

It is, therefore, a more specific object of the invention to provide a method and apparatus for removing undesired gases from a stream including hydrogen in order to obtain pure hydrogen.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

FIG. 1 is a diagrammatic view of the apparatus and the piping connection between the adsorption towers, FIG. 2 is a view in section through one of the towers, and FIG. 3 is a view taken on line 3—3 of FIG. 2.

Referring to the drawings there is shown in FIG. 1 adsorption towers 1 and 2 and the piping connected with these towers to make an operable piece of equipment. The towers themselves are identical and the same reference numerals are used to indicate identical parts of each tower. The reference numerals in tower 2, however, have an A after them in order to differentiate one tower from the other during the subsequent description.

Each of the towers includes a pair of chambers including a central chamber 3 and an annular chamber 4 that surrounds and is spaced from the central chamber. This central chamber has enclosed within it a coil of tubing 5, shown herein as a double coil, while chamber 4 includes a coil 6 of tubing extending through it, which is shown herein as being a triple coil. Such coils permit the heat exchange medium flowing through them to have a greater effect on the adsorbing material in the chamber than would a single coil. Each chamber has at its bottom a bed of coarse granular material 7 which serves to spread the gas flowing through the chamber, and is filled above the granular material with a suitable adsorbent material 8 for the type of purifying operation that is to be carried out. As noted above the description will be directed to the purification of hydrogen, in which case the adsorbing material will be a granular alkali metal aluminosilicate. The two chambers are surrounded by a housing 9 that is large enough so there is a space between the outside of chamber 4 and the housing. The upper end of the housing terminates in a stack 11. It is noted that chamber 3 is covered with a thin layer 12 of insulation. The two chambers are connected by pipes consisting of a pipe 13, which extends from the upper end of chamber 4 through a cooler 14, back through a pipe 15 having a check valve 16 in it, to the top of tower 3. There is also provided a bypass around the cooler 14 including a coil of tubing 17 which surrounds chamber 3 and is supported by suitable brackets 18. One end of this coil is connected by a pipe 19 with the inlet of chamber 3, and the other end of the coil is connected by a pipe 21, having valve 22 therein, with the outlet of chamber 4.

The gas to be treated, which in this case will be hydrogen mixed with carbon dioxide and carbon monoxide, comes from a hydrogen forming unit through a pipe 23 that is split to supply gas to both of the towers 1 and 2. This gas flows through a three-way valve 24 and suitable manifolding into the bottom of annular chamber 4. The other adjustment of valve 24 connects the lower end of the chamber with a pipe 25 that leads to waste at substantially atmospheric pressure. The outlet from chamber 3 consists of a pipe 26 leading through a check valve 27, to a pipe 28, through which the purified gas flows to a point of use. It is noted that there is a small restricted orifice 29 between pipes 26 and 28 parallel with check valve 27.

During the time that gas is being purified, as indicated in the description of operation below, the gas is flowing from pipe 23 through tower 4, cooler 14 and chamber 3 to pipe 28. From time to time the adsorbent material in the towers requires reactivation. When this is done the adsorbent material is first heated and then cooled back to its operating temperature. Heating is accomplished by introducing hot air or combustion gas from a suitable source through a pipe 31, valve 32 and pipe 33 to housing 9 between and around the chambers. As best shown in FIG. 3, the pipe 33 is connected with a plurality of manifolds 34 that terminate in inlet pipes 35 extending between the two chambers and between the housing and the outer chamber. The hot air or gas flowing through the housing serves to heat the chambers, and is exhausted through stack 11.

Chamber 4 is cooled by flowing water from a supply 36 through a valve 37 to coil 6, and discharging the water to a drain through pipe 39. It is noted that a vent 38 is provided in the pipe between the valve and the coil. The adsorbent in chamber 3 is cooled by circulating brine through coil 5. The brine is supplied from a suitable refrigerating apparatus through pipe 41 having a valve 42 therein, and is discharged through a pipe 43 returning to the refrigerating apparatus. It is noted that the same refrigerating apparatus can be used for cooler 14 in order to cool the gas flowing between the two towers.

As noted above the construction of the towers is identical, and each tower is provided with a control valve that serves to control the supply of gas to the tower as well as the supply of hot air or gas and the cooling fluids. Each of these valves is preferably of a conventional pneumatic type that is opened by the application of a pneumatic pressure to a valve operating element, and is closed by a spring when the pressure is released. In the operation of the apparatus these valves are operated in a predetermined sequence by a conventional timer 44. This timer serves to permit the application of a valve opening pressure to the valve operating element, or to relieve this pressure and exhaust it to the atmosphere. Since the valves and timer mechanisms of the type used herein are well known in the art, a description thereof is not included.

The chambers in each of the towers are of such a size that they will hold enough adsorbent material at the pressure used to purify the inlet gas for a given period of time, usually one hour, before the adsorbent material requires reactivation. During this time the chambers in the other tower are being heated and cooled for the reactivation cycle. Generally speaking the system will be operated at a pressure of 100 p.s.i. since at this pressure the adsorbent material will hold enough of the stripped gas for a reasonable time cycle with a reasonable sized tower. Furthermore, there is a sufficient pressure differential in the system to operate the check valves and supply the purge gas during reactivation. In the description that follows assume that it is time to reverse the towers, and that the gas stream to be purified has been flowing through tower 1, while tower 2 was being reactivated.

Timer 44 will cause operation of valve 24A to connect pipe 23 with chamber 4A and will close valve 22A. Valves 37A and 42A will be open, with cooling water flowing through coil 6A to keep the material in that chamber at substantially ambient temperature while brine flowing through coil 5A will keep the material in chamber 3A at a temperature of about $-10°$ F.

The impure hydrogen stream being treated under a super-atmospheric pressure will then flow first through chamber 4A where the adsorbent at the temperature of that chamber has a selective affinity for $CO_2$, to remove that impurity from the gas stream. Any water vapor with the hydrogen will also be removed in this chamber. Thereafter the effluent is cooled in heat exchanger 14 to a temperature of about $-20°$ F. before flowing through check valve 16A into chamber 3A. The adsorbent in chamber 3A at a temperature of about $-10°$ F. has a selective affinity for CO to remove this gas from the hydrogen, leaving a substantially chemically pure hydrogen to flow through check valve 27A to pipe 28 and a point of use.

Simultaneously with the adjustment of valve 24A, the valve 24 is adjusted to connect chamber 4 in tower 1 with waste line 25. Valves 37 and 42 will be closed to shut off the flow of coolant through the chambers, and valve 22 will be opened. Opening of this latter valve permits both chambers to be blown down to reactivation pressure. This can be accomplished since chamber 3 is connected to atmosphere by valve 24, and to chamber 4 by pipe 19, coil 17, pipe 21, valve 22 and pipe 13. Check valves 16 and 27 close when the pressure in the chambers is reduced to isolate this tower from the rest of the system.

During the time that reactivation is taking place a stream of purge gas flows through the chambers in a reverse direction from the flow when the tower is on stream. Purge gas in a regulated amount, determined by the size of orifice 29, flows upwardly through chamber 3, and, since check valve 16 is closed, will flow through coil 17, pipe 21 and valve 22 downwardly through chamber 4. The gas is exhausted through valve 24 to waste line 25. The function of the purge gas is to strip the impurities from the adsorbent material as the chambers are being heated.

While the above operations are taking place, valve 32 is opened. When this occurs heated air or combustion gases at a temperature of about $500°$ F. flows through the space between housing 9 and the chambers. It is desirable to heat chamber 4 to $500°$ F. and heat chamber 3 to only $200°$ F. Practically without exception chambers operating at lower temperatures can be reactivated at lower temperatures. The lowest economic temperature should be used because this will entail the minimum refrigeration load to cool the bed back down to operating temperature.

The difference in the temperature to which the material in the chambers is heated is accomplished by using the purge gas at its normal temperature in chamber 3 and insulating its outer wall. The purge gas leaving chamber 3 will pass through coil 17 where it will be heated close to the temperature of the gases in the housing before it passes into chamber 4. Here it not only strips the impurities from the adsorbent, but also assists in the heating.

If the apparatus is working on a one hour cycle, which is usual, the chambers will reach the desired reactivating temperature in approximately thirty minutes. At this time, timer 44 will close valve 32 and open valves 37 and 42. Thus the heat is cut off and coolant will flow through the coils in the chambers to bring the adsorbing material down to operating levels. Cooling of the material will take not more than one half hour, so that the tower is ready to be placed on stream by the time the other tower is due for reactivation. The continued flow of purge gas through the tower during the cooling cycle assists in heat transfer to accelerate the cooling.

It will be seen that the design of the cooling towers permits simultaneous heating of both chambers by the same heating medium, and with the ability to heat the chambers to different temperatures. The arrangement is such that there is a simplification of accessory equipment to be used with the apparatus and it requires a minimum number of valves that can be remotely operated on a time cycle basis.

While in accordance with the provisions of the statutes, I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. In gas adsorption apparatus, a pair of towers each comprising a pair of concentric chambers spaced from each other and a housing spaced from and surrounding the outer chamber, a bed of solid adsorbing material in each chamber, conduit means separate from said housing connecting said towers in parallel and the chambers in each tower in series, a valve in said conduit means to direct gas to be treated alternately to said towers, a check valve in said conduit means down stream of each tower to prevent return flow of said gas stream through said towers, means to supply a heated gas to said housings to flow around and heat the chambers for reactivation of said adsorbing material, valves operative to direct the heated gas to the housing of the tower through which the gas stream is not flowing, cooling coils in each chamber, means to supply a cooling fluid through each coil, valves operative to control the flow of cooling fluid individually through each coil, and a restricted conduit connected to said conduit means downstream of said check valves to direct a flow of purging gas through the chambers of said towers.

2. In a gas adsorption process wherein a gas stream is purified by passing it through a first tower of adsorbing material while a second tower of adsorbing material is being regenerated, each of said towers including two chambers in parallel, the process of regenerating said towers which comprises flowing a purge gas of effluent from the first tower in series through the chambers of the second tower, heating said chambers from the exterior thereof, heating the purge gas after it leaves the first chamber prior to its introduction into the second chamber so that said gas can also heat said second chamber from its interior, continuing said heating until said first chamber is heated to a predetermined temperature and said second chamber is heated to a predetermined higher temperature, said purge gas, during said heating period removing impurities from the adsorbing material in the chambers of said tower, discontinuing said heating when said predetermined temperatures have been reached, and individually cooling said chambers to different predetermined temperatures with said first chamber being cooled to a lower temperature than is said second chamber.

3. Adsorption apparatus comprising structure forming a pair of towers, each tower including a first, central chamber and a second chamber surrounding and spaced from the first and a housing surrounding and spaced from said chambers, each chamber being filled with an adsorbent material, means separate from said housing to direct a stream of gas to be treated through said chambers in series, and means to reactivate the adsorbent material including a first coil of tubing in said first chamber, a second coil of tubing in said second chamber, means to supply a coolant through said second chamber, means to supply a heated gas through said housing around said chambers, means to supply a purging gas through said chambers in a reverse direction to the flow of gas to be treated including means forming a passage for said purge gas in said housing as it flows between said chambers, and means to control the flow of gas to be treated, coolant, heated gas and purge gas in a predetermined sequence.

4. Adsorbing apparatus including a plurality of towers, each tower including a first chamber, a second chamber surrounding and spaced from said first chamber, each of said chambers being filled with an adsorbent material, a housing surrounding and spaced from said chambers, means to direct a gas to be treated through said chambers in series, a coil of tubing in each of said chambers, means to supply cooling water through the coil in one chamber, means to supply cooling brine through the coil in the other chamber, means to supply heated gas through the housing surrounding said chambers, and means to control flow of the supplies of water, brine and heated gas through said chambers in a predetermined sequence.

5. Adsorption apparatus including structure forming an adsorption tower including a first chamber, a second chamber surrounding and spaced from said first chamber, each of said chambers containing an adsorbent material, a housing surrounding and separated from said chambers, a first coil of tubing in said first chamber, a second coil of tubing in said second chamber, means separate from said housing to direct a gas to be treated through said chambers in series, a valve to control said means, separate means to supply a cooling fluid to each of said coils, a separate valve to control the supply of fluid from said cooling fluid supply means to each coil, means to supply a heated gas to said housing to flow around said chambers, a valve to control the flow of heated gas, and means to operate said valves in a predetermined sequence to supply gas to said chambers, to heat said chambers and to cool said chambers.

6. The combination of claim 5 including means to direct a purge gas through said chambers in series in a direction opposite to the flow of gas to be treated including a coil of tubing in the space between said chambers, and a valve to control the flow of purge gas.

7. The combination of claim 5 including means to chill the gas to be treated as it flows between said chambers.

8. Gas adsorption apparatus including in combination a tower comprising a first chamber, a second annular chamber surrounding and spaced from said first chamber, each of said chambers being filled with an adsorbent material, means to supply a gas to be treated in series through said chambers, a coil of tubing in each chamber, means to supply a cooling fluid individually to said coils, means to heat said chambers simultaneously, said heating means including a housing around said chambers, means to supply a heated gas to said housing to flow around said chambers, and a layer of insulation surrounding said first chamber whereby said first chamber will not be heated as much as said second chamber.

9. Apparatus for purifying a gas by adsorption comprising a tower including a first chamber, a second chamber annular in shape surrounding and spaced from said first chamber, a pipe connecting said chambers, a supply pipe leading to one chamber, a delivery pipe extending from the other chamber whereby gas to be treated will flow in series through said chambers, each chamber having a coil therein through which a coolant is to flow, a housing surrounding and spaced from both of said chambers, means to supply a heated gas to said housing and direct said heated gas to flow around said chambers to heat said chambers, valve means operative to control individually the flow of gas to be treated through said chambers, the flow of coolant through said tubes and the flow of heated gas to said housing, and control means to operate said valve means in sequence to supply gas to be treated to said chambers, to heat said chambers and to cool said chambers.

10. The apparatus of claim 9 in which said operating means includes means to adjust the time said gas to be treated flows through said chambers to twice the length of time said chambers are heated and cooled.

11. Apparatus of claim 9 including a valve in said delivery pipe to pass gas only in a direction away from the chamber connected therewith, a valve in said pipe connecting said chambers operative to pass gas only in a direction from said supply pipe to said delivery pipe, means to supply a fixed amount of gas less than the supply of gas to be treated from a point downstream of the valve in said delivery pipe to the chamber connected thereto, a second pipe forming a passage between said chambers parallel to said first mentioned pipe, a portion of said second pipe being located in said housing, a valve in said second pipe, and means operative to close the valve in said second pipe when gas to be treated is flowing through said chambers.

References Cited in the file of this patent

UNITED STATES PATENTS

| | | |
|---|---|---|
| 1,617,305 | Guyer et al. | Feb. 8, 1927 |
| 1,680,840 | Barnebey | Aug. 14, 1928 |
| 1,717,103 | Godel | June 11, 1929 |
| 1,773,224 | Godel | Aug. 19, 1930 |
| 1,896,916 | Perley | Feb. 7, 1933 |
| 2,083,732 | Moore et al. | June 15, 1937 |
| 2,359,660 | Martin et al. | Oct. 3, 1944 |
| 2,434,419 | Laughlin et al. | Jan. 13, 1948 |
| 2,699,837 | Van Note | Jan. 18, 1955 |
| 2,747,681 | Schuftan et al. | May 29, 1956 |
| 2,850,114 | Kehde et al. | Sept. 2, 1958 |
| 2,861,651 | Miller | Nov. 25, 1958 |

FOREIGN PATENTS

| | | |
|---|---|---|
| 777,233 | Great Britain | June 19, 1957 |